MATHEMATICS TRAINING TOY

Educators, in view of recently acquired experimental evidence, now generally concur that very young children are apparently capable of conceptual learning, such as mathematics, and memory learning, such as languages. Traditionally, only older children or adults were exposed to such information, on the belief that younger children could not comprehend the information. Today, children are being taught at progressively younger ages. The complexities of today's society requires that each citizen must possess more knowledge than in bygone years; acquisition by the child of fundamental knowledge at a young age will significantly reduce the burden of teaching increasing amounts of information during the primary and secondary school years.

Many teaching devices and educational toys have been developed to aid in the education of a child. A distinction may be made between teaching devices and educational devices. Educational devices generally require an experienced person to operate the device in a certain mode in order to illustrate a principle in a rather dramatic fashion. Unless the device is operated in that particular mode, meaningful results will not be shown. On the other hand, the ways in which toys are used are limited only by a child's imagination. A child may soon lose interest, forget or fail to understand a complex series of steps which must be followed to arrive at a specific result. The curiosity, ingenuity, and imagination of the child soon takes hold and the child begins to use a device or toy in various manners. With a toy or device where a desired result only occurs following specific steps, the educational value is lost when the child begins to innovate. Accordingly, in order for a toy to have educational value, the toy must be capable of encouraging a given mode of operation and must illustrate a meaningful principle even when utilized in various modes.

Further, it is known that the most effective toys, those toys which maintain the attentive interest of a child, stimulate a combination of the child's sensory perceptions. Many educational toys are limited in effectiveness by failure to stimulate a variety of the child's perceptual senses. Tactile manipulation maintains interest and is important for training the motor reflexes. Visual stimulation, such as color, usually delights a child. Noise, movement, and action further stimulates a child. Toys with which the child may be fairly aggressive are also very effective.

The present invention relates to an educational toy which may be easily manipulated by a child to illustrate meaningful mathematical principles to reinforce the educational process. The toy of the invention may be used with or without adult supervision. The toy of the present invention, incorporates sight, sound, movement, and action to stimulate a child's visual, tactile, and auditory senses. Faculties to maintain a child's interest and stimulate his imagination.

More specifically, the present invention relates to a toy for illustrating arithmetic operations such as addition, multiplication, substraction, and division. A given number of hard, rollable objects, such as marbles, are placed as a column in the top end of a hollow cylinder having a retaining spring detent at the bottom end. When one of a number of graduated-length pegs is inserted in the cylinder and pushed down against the marbles, the spring detent will pass a number of marbles according to the length of the peg. The cylinder is mounted on a frame and leads to a ramp and to a catch basin. Marbles which are forced past the detent will roll down the ramp into the catch basin; the marbles are then to be inserted, one-by-one, back into the top of the cylinder. A child, thus, is encouraged to count the marbles as he inserts them. The pegs are of a different color, thereby reinforcing the fact that the number of released marbles varies according to the peg length. The pegs may be provided with handles with card holders thereon and a number of problem cards may be provided with the toy. Each card may display an arithmetic expression whose result is a positive integer. The cards may then be colored such that the card color corresponds to the color of the peg which will drive a number of marbles from the cylinder equal to the solution of the arithmetic expression on the face of the card. Thereby, the toy teaches that various arithmetic combinations yield the same integral value, directly expressed in marbles.

It is, therefore, an object of the present invention to provide an educational toy to aid in the teaching of arithmetic.

A further object of the invention is to provide an educational toy involving motion, action, sound, and tactile stimulation.

A still further object of the invention is to provide an educational toy which yields meaningful results and encouraging a single mode of operation.

Another object of the invention is to provide an educational toy which may be aggressively operated by a child.

Yet another object of the invention is to provide an educational toy which includes the release of a column of marbles from a hollow cylinder having a spring-loaded detent at the discharge end.

Still another object of the invention is to provide an educational toy discharging a number of marbles from a cylinder in accordance with the length of a peg inserted in the cylinder.

These and other objects and advantages of the present invention may be readily ascertained by referring to the following description and appended illustrations in which:

FIG. 1 is a perspective view, partially cutaway, of one embodiment of the invention;

FIG. 2 is a perspective detail of a component member of the invention;

FIG. 3 is another perspective detail of a marble holder of the invention;

FIG. 4 is still another perspective detail of a problem card for use with the invention;

FIG. 5 is a section view of a detail of the invention;

FIG. 6 is a side view, partially cutaway of the invention; and

FIG. 7 is a detail of some of the components of the invention.

In the device selected for illustration, a frame, indicated in general by numeral 1, is embodied as a box with upstanding opposed sides 2 and 3, upstanding opposed ends 4 and 5 and top 6. A wide variety of frame materials may be used; clear plastic or plexiglass is suggested as enhancing the visual interest of the toy.

3,690,019
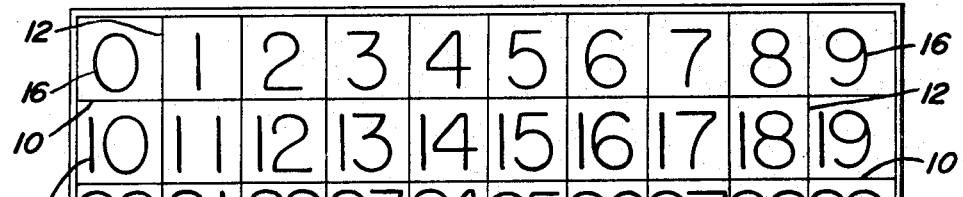

NUMBER SEQUENCE TEACHING AID

This invention relates to certain new and useful paraphernalia which lends itself to feasible and acceptable use as an instructing and teaching aid, that is, when properly adopted, for example, for use in diversified private day schools, various types of kindergarten classrooms or for similar places of instruction and learning attended by pre-school and kindergarten youngsters.

One of the many difficult concepts for an average pre-school or first grade child to cope with is learning to satisfactorily comprehend the before and after sequence of written or printed mathematical numbers. In coping with the problem, generally stated, a significant need was to find an interesting way and simple and practical equipment to introduce the herein disclosed learning concept to youngsters. To the ends desired, a simple and practical charactered or numbered chart is provided and, in addition, a simple complemental slide through the medium of which youngsters who acquaint themselves therewith soon learn the underlying principles of given numbers and the immediately associated before and after numbers.

Experience has shown that by adopting the game-like equipment herein revealed the young users soon learn to acquaint themselves with component parts which they can touch and see. By correlating concrete and abstract materials and what is herein referred to as a peek-a-boo method the procedure becomes interesting, motivating and almost invariably quite successful.

Experience has shown that adoption and use of the equipment provides children with skills to be used in the year to follow with the now and much discussed numberline. Further experience has shown that after working with the method and means disclosed children can later substitute "More" for "After" in addition and "Less" for "Before" in subtraction when the numberline is introduced.

Currently followed instruction is designed to be more individualized rather than grouped. The present invention was constructed with this idea in mind. Also, prior art inventions are not intended for pre-school and first year classroom situations.

This invention has manual appeal. The children actually hold with what they are working. The chart and slide are a comfortable size making it easy to work with.

The invention invokes the idea of discovery. Children using it will discover all by themselves the number that comes before and/or after the given number. This idea of discovery gives the child self-confidence and satisfaction of accomplishment.

Briefly the herein disclosed adaptation is an innovation in that it is characterized by a simple cardboard, plastic or equivalent square chart which has a playing face or surface. This surface is similar, generally speaking, to surfaces found on Bingo cards, calendars, checkerboards and the like in that the surface is transformed by horizontal and vertical intersecting lines into columnized squares, each square confining the coacting number or equivalent character. A bodily applicable and removable slide is provided and this is manually shiftable atop the columnized numbered surface. The slide has a plurality of windows in the median portion thereof which are capable of being selectively aligned and informatively used in conjunction with the numbers singly and collectively. The main window is wholly uncovered and constantly open. The respective end portions of the sleeve or sheath to the right and left of the main window embody socket-like receivers. One receiver to the left of the main window is provided with a printed legend "Before". The other receiver to the right of the main window is provided with a printed legend "After". A non-transparent strip member is slidingly mounted in each receiver and is so arranged and constructed that it is adapted to temporarily cover and mask the respectively coverable auxiliary windows. These auxiliary windows when covered function to block the underlying members from view at will and are selectively actuatable in a manner for number exposing and viewing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the columnized sequentially numbered chart.

FIG. 2 is a view in perspective of the aforementioned three-part triple windowed manually applicable and removable slide.

And FIG. 3 is a view on a reduced scale showing the upper four horizontal columns in particular and showing the slide, that is the slide of FIG. 2, applied over the numbers in the third horizontal column and which shows the main window in which the numeral 25 is viewed, the open window to the left in which the "Before" number 24 is seen and the closed window to the right which shows in phantom lines the covered number 26, that is the "After" number.

The aforementioned chart is designated in FIGS. 1 and 3 by the numeral 6. This chart in practice is made from a sheet of cardboard of plastic and is square in plan. The bottom side, which is not illustrated, is plain. The top playing or usable surface is columnized, that is the entire area is provided with vertical and horizontal columns. More specifically a plurality of printed horizontal lines 10 ranging from the upper to the lower edge in FIG. 1 cross the coacting vertical lines 12 and in this manner provide a plurality of equal columnized squares, one blank square being denoted for example in the lower right hand corner as at 14. All but these blank squares are provided with sequential numbers. As before stated the squares could be provided with characters other than numbers but for simplicity and keeping in mind the teaching aid aspect of the invention numbers are utilized, the 0 being denoted by the numeral 16 at the upper left in FIG. 1 and all of the other numbers in the horizontal row or column being denoted also by the numeral 16. This top horizontal row ranges from 0–9. In the vertical columns or rows there are similar numbers and the numbers in the first vertical column at the left in FIG. 1 are differentiated for convenience by the numeral 18. Thus the playing surface of the chart is provided with a multiplicity of sequentially or orderly arranged numerals or numbers ranging here from 0 to 100.

The bodily attachable and shiftably usable unit which is referred to here as the slide is denoted by the numeral 20. It comprises a plastic or cardboard suitably colorful flat elongated open-ended sleeve of a length less than the length of the horizontal rows or columns. The left hand end of the sleeve is denoted at 22 and the right hand end of the sleeve at 24. It will be evident that there is a centralized square opening at 26 which provides for the mounting therein of a permanent constantly open or uncovered main window 28. Similar square openings one to the left at 30 and the other one to the right at 32 are provided and hereagain these openings are provided with permanently attached transparent windows the one at the left being denoted at 34 and the one at the right of the window 28 by the numeral 36. The face of the left hand area of the slide is denoted at the left at 38 and it has printed or otherwise displayed thereon the self-descriptive word "Before" and denoted by the numeral 40. The legend or inscription at the right in the area 42 also has a self-explanatory legend "After" which is denoted by the numeral 44. The insertable and removable and manually adjustable inserts or strip members are denoted, the one at the left by the numeral 46, and the one at the right, by the numeral 48. The projecting end portions are denoted by the numerals 50 and 52 respectively. The portions of the sleeve into which these strip members are slidingly projectable and retractable are referred to as socket-like receivers. The strip members are slightly longer than the length of the socket-like receivers and hence the end portions project beyond the ends of the sleeve so that they can be caught hold of and operated by the child or other user. It follows that the chart is shown advantageously in FIG. 1 and the selectively placeable and usable slide is denoted at 20. The strip members 46 and 48 constitute number masking shutters and their manner of placement and use is thought to be self-explanatory.

The chart was made beginning with 0 for two reasons. First of all children need to understand that 0 is actually a number. They will find this so when they begin to work with empty sets and also by starting with 0 "zero", the tens, that is, in the 10 columns to the left side make it easier to find a given number with the slide when properly used for example as brought out in FIG. 3. FIG. 3 shows one position of the slide where it is placed in alignment with and atop the third horizontal column of numbers and in fact shows how the shutters are operated to partly achieve the Before and After results in relation to the number 25.

This game may be played in a small group or by the entire classroom, to wit:

Give out Peek-a-Boo charts and complemental slides to each child or, alternatively, to chosen leaders of the group. Have the children or the leader place the main spotting or finder window of the slide on zero, the staring number.

Explain to children how to position and keep said window lined up with zero until the given number is announced. (as an example, 24 may be announced).

Now say "Is everybody ready? Let's all play Peek-a-Boo!" "look for number 24." Each child will look for the number or the leader will find it with help from his group. "Raise your hand when you have found the number."

Check now to make certain everyone has properly found 24, the given number.

The teacher now asks, "What comes before 24?" The child or leader who recognizes the number will say "Peek-a-Boo". The teacher will let the child speak. If the child is correct that accomplishment constitutes a game point for the child or group.

The same procedure is used in naming the number (25) that comes after 24.

The group leader or child who gives the most correct answers out of 10 given members is declared a "Peek-a-Boo Winner". The teacher can keep score on a chalkboard for the children to see.

In playing for diagnostic measure (not illustrated) the following steps can be resorted to, thus:

Step 1.
   Pass out diagnostic sheets (not shown) along with Peek-a-Boo charts and slides.

Step 2.
   Explain to the children that they will play the game quietly, they will write their answers in the spaces provided on each side of the given number.

Step 3.
   When the children have finished, the teacher will correct mistakes, if any.

Step 4.
   This procedure can also be done in small groups with a leader if desired.

It is submitted that by studying the views of the drawing singly and collectively the reader will be in a position to understand the construction and purpose of the chart 6 and the columnized numbers thereon, as well as the construction of the slide 20 and how it can be best used for assisting the teacher or instructor and aiding the youngsters to acquaint themselves with the underlying principles of the use of numbers, for advancing school room activities.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A game-type instructing and teaching aid for use in a day school, kindergarten classroom, or similar place of instructions and learning comprising: an easy-to-handle chart having a checkerboard-type surface systematically providing horizontal and vertical columnized squares, each square provided with an individual character, the characters which are confined in said squares being informatively interrelated and sequentially plotted for knowledgeable reference purposes, and a bodily applicable and removable slide which is manually and shiftably usable atop said surface, said slide having a plurality of windows which are capable of being selectively aligned and informatively used in conjunction with certain of said characters, and said slide being provided with three windows, namely, a main centrally located window and a pair of auxiliary windows, one of which is immediately to the left of and the other one of which is immediately to the right of said main window.

2. The instructing and teaching aid defined in and according to claim 1, and wherein said main window is permanently open to clearly reveal the number with which it is registrably aligned, and individual number masking shutters on said slide for normally closing said auxiliary windows and blocking the numbers therebeneath until properly opened and closed by the user.

3. A game-type instructing and teaching aid for use in a day school, kindergarten classroom, or similar place of instruction and learning comprising: an easy-to-handle chart having a checkerboard-type surface systematically providing horizontal and vertical columnized squares, each square provided with an individual character, the characters which are confined in said squares being informatively interrelated and sequentially plotted for knowledgeable reference purposes, and a manually applicable and removable slide which is designed and adapted to be lined up with any one of the horizontal columns and which can be readily shifted to any area and positioned for use atop said surface, said characters comprising horizontal rows of conventional numbers which are sequentially arranged in numerical order, said slide comprising a flat open-ended sheath-like sleeve which is of a width comparable with the width of any selected one of said horizontal columns, the median portion of said sleeve having a main window for viewing and which is adapted to be positioned atop and lined up with a selected character, and also having a pair of similar auxiliary windows, one of which is to the immediate left of said main window and the other one of which is to the immediate right of said main window.

4. The instructing and teaching aid defined in and according to claim 6, and wherein said main window is wholly uncovered and constantly open, the respective end portions of said sleeve to the right and left of said main window each embodying a socket-like receiver, one receiver to the left of said main window being provided with the printed legend "Before" and the other receiver to the right of said main window being provided with the printed legend "After", and non-transparent strip members slidingly mounted in said receivers and being adapted to temporarily cover and mask their respectively coverable auxiliary windows, said auxiliary windows when covered functioning to block the underlying "Before" and "After" numbers from view at will and being selectively openable for number exposing and viewing, as desired.

5. The instructing and teaching aid defined in and according to claim 4, and wherein said sleeve is of a length less than the length of said horizontal columns, said strip members being of a length longer than the length of their respectively cooperable receivers and having their outer ends projecting outwardly to accessibly grippable positions beyond the corresponding outer open ends of said sleeve.

6. The instructing and teaching aid defined in and according to claim 8 and wherein said characters comprise mathematical numbers which are displayed in sequential order, for example, 0, 1, 2, 3, 4, 5–9 and so on, said numbers being presented for viewing in such sequential order in the top horizontal column, said sequential numbering being likewise methodically and mathematically carried out in the downwardly progressing horizontal columns and the numbering in the vertical columns being calculated and displayed in tens, for example, the first vertical column presenting 0, 10, 20, 30, 40 and so on, the second vertical column presenting 1, 11, 21, 31, 41 and so forth, thus making it easier to locate a desired or given number with said slide.

* * * * *